United States Patent [19]

Katchman

[11] 4,002,701

[45] Jan. 11, 1977

[54] POLYPHENYLENE ETHER RESIN COMPOSITIONS CONTAINING AN N-ALKANOYL-P-AMINOPHENOL STABILIZER

[75] Inventor: Arthur Katchman, Delmar, N.Y.

[73] Assignee: General Electric Co., Pittsfield, Mass.

[22] Filed: Nov. 25, 1974

[21] Appl. No.: 527,138

[52] U.S. Cl. .......................... 260/874; 260/45.7 P; 260/45.75 W; 260/45.9 AA; 260/876 B; 260/876 R; 260/889; 260/892; 260/898

[51] Int. Cl.² .................. C08L 23/00; C08L 25/00

[58] Field of Search ... 260/874, 45.9 AA, 45.75 W, 260/45.7 P

[56] References Cited

UNITED STATES PATENTS

| | | | |
|---|---|---|---|
| 3,761,541 | 9/1973 | Katchman | 260/874 |
| 3,792,120 | 2/1974 | Summers et al. | 260/874 |
| 3,792,121 | 2/1974 | Abolins et al. | 260/874 |

*Primary Examiner*—Richard B. Turer
*Attorney, Agent, or Firm*—William F. Mufatti; Edward A. Hedman; James V. Costigan

[57] ABSTRACT

Novel stabilized compositions of a polyphenylene ether resin and a vinyl aromatic resin are disclosed which include a minor amount of an N-alkanoyl-p-aminophenol.

18 Claims, No Drawings

POLYPHENYLENE ETHER RESIN COMPOSITIONS CONTAINING AN N-ALKANOYL-p-AMINOPHENOL STABILIZER

The present invention provides novel stabilized compositions of a polyphenylene ether resin and a vinyl aromatic resin that includes a minor amount of an N-alkanoyl-p-aminophenol as a thermal stabilizer.

BACKGROUND OF THE INVENTION

The term "polyphenylene ether resin" includes a family of polymers well known to those skilled in the art, and they are made by a variety of catalytic and non-catalytic processes from the corresponding phenols or reactive derivatives thereof. By way of illustration, certain of the polyphenylene ethers are disclosed in Hay, U.S. Pat. Nos. 3,306,974 and 3,306,875, and in Stamatoff, U.S. Pat. Nos. 3,257,357 and 3,257,358. In the Hay patents, the polyphenylene ethers are prepared by an oxidative coupling reaction comprising passing an oxygen-containing gas through a reaction solution of a phenol and a metal-amine complex catalyst. Other disclosures relating to processes for preparing polyphenylene ether resins, including graft copolymers of polyphenylene ethers with styrene type compounds, are found in Fox, U.S. Pat. No. 3,356,761; Sumitomo, U.K. Pat. No. 1,291,609; Bussink et al, U.S. Pat. No. 3,337,499; Blanchard et al, U.S. Pat. No. 3,219,626; Laakso et al, U.S. Pat. No. 3,342,892; Borman, U.S. Pat. No. 3,344,166; Hori et al, U.S. Pat. No. 3,384,619; Faurote et al, U.S. Pat. No. 3,440,217; and disclosures relating to metal based catalysts which do not include amines, are known from patents such as Wieden et al, U.S. Pat. No. 3,442,885 (copper-amidines); Nakashio et al, U.S. Pat. No. 3,573,257 (metal-alcoholate or -phenolate); Kobayashi et al, U.S. Pat. No. 3,455,880 (cobalt chelates); and the like. In the Stamatoff patents, the polyphenylene ethers are produced by reacting the corresponding phenolate ion with an initiator, such as peroxy acid salt, an acid peroxide, a hypohalite, and the like, in the presence of a complexing agent. Disclosures relating to non-catalytic processes, such as oxidation with lead dioxide, silver oxide, etc., are described in Price et al, U.S. Pat. No. 3,382,212. Cizek, U.S. Pat. No. 3,383,435 discloses polyphenylene ether styrene resin compositions. Katchman, U.S. Pat. No. 3,663,661 also discloses polyphenylene ether resin compositions. All of the above-mentioned disclosures are incorporated herein by reference.

Compositions of polyphenylene ethers have been known to exhibit inferior physical properties after exposure to thermal stress for prolonged periods. Also ultraviolet light tends to degrade polyphenylene ether resins. This has resulted in a need for stabilizers that prevent embrittlement of these compositions. Applicant has now discovered that the use of a minor amount of an N-alkanoyl-p-aminophenol in polyphenylene ether compositions will produce a composition that has greatly enhanced resistance to thermal degradation and degradation induced by ultraviolet light.

Accordingly, it is a primary object of this invention to provide polyphenylene ether compositions that have improved resistance to thermal aging.

It is also an object of this invention to provide a new method for imparting thermal stability to a polyphenylene ether resin composition.

It is also an object of this invention to provide polyphenylene ether compositions that are stable to ultraviolet light.

DESCRIPTION OF THE INVENTION

The present invention provides a thermoplastic molding composition having improved resistance to thermal aging and degradation due to ultraviolet light which comprises:

a. a polyphenylene ether resin;
b. a vinyl aromatic resin; and
c. an amount of an N-alkanoyl-p-aminophenol sufficient to improve the resistance of said composition to thermal aging.

The N-alkanoyl-p-aminophenols include those compounds having an alkanoyl moiety of from 8-23 carbon atoms. These include N-lauroyl-p-aminophenol, N-stearoyl-p-aminophenol, N-tridecanoyl-p-aminophenol, N-pentadecanoyl-p-aminophenol, N-heptadecanoyl-p-aminophenol. Those skilled in the art will appreciate that mixtures of the N-alkanoyl-p-aminophenol compounds may be used and that this term is used to include these mixtures.

The polyphenylene ether resins are preferably of the formula:

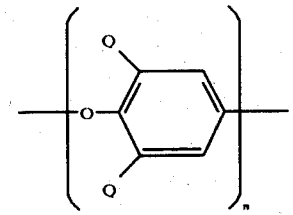

wherein the oxygen ether atom of one unit is connected to the benzene nucleus of the next adjoining unit, $n$ is a positive integer and is at least 50, and each Q is a monovalent substituent selected from the group consisting of hydrogen, halogen, hydocarbon radicals free of a tertiary alpha carbon atom, halohydrocarbon radicals having at least two carbon atoms between the halogen atom and the phenyl nucleus, hydrocarbonoxy radicals and halohydrocarbonoxy radicals having at least two carbon atoms.

The preferred polyphenylene ether resin is poly(2,6-dimethyl-1,4-phenylene) ether resin.

The vinyl aromatic resin should have at least 25% of its units derived from a compound of the formula:

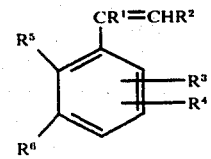

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen, and lower alkyl of from 1 to 6 carbon atoms; $R^5$ and $R^6$ are selected from the group consisting of hydrogen and lower alkyl and alkenyl groups of from 1 to 6 carbons or $R^5$ and $R^6$ may be concatenated together with hydrocarbyl groups to form a naphthyl group.

Materials that may be copolymerized with the vinyl aromatic monomer include those having the general formula:

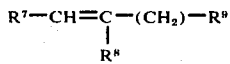

wherein $R^7$ and $R^8$ represent a substituent selected from the group consisting of hydrogen, halogen, an alkyl group of 1–4 carbon atoms, carboalkoxy having from 1–4 carbon atoms or $R^7$ and $R^8$ taken together represent an anhydride linkage (—COOOC—) and $R^9$ is hydrogen, vinyl and alkyl or alkenyl group having 1–12 carbon atoms, cycloalkyl having 3-6 carbon atoms, carboalkoxy having 2 to 6 carbon atoms, alkoxy-alkyl having 2 to 6 carbon atoms, alkylcarboxy having 2 to 6 carbon atoms, ketoxy, halogen, carboxy having 1 to 6 carbon atoms, cyano or pyridyl and n is a while number between 0 and 9.

The general formulas set forth above include by way of example, homopolymers such as homopolystyrene and monochloropolystyrene, the modified polystyrenes, such as rubber-modified, high-impact polystyrene and the styrene containing copolymers, such as the styrene acrylonitrile copolymers, styrene butadiene copolymers, styrene-acrylonitrile-α-alkyl styrene copolymers, styrene-acrylonitrile-butadiene copolymers, poly-α-methylstyrene, copolymers of ethylvinylbenzene, divinylbenzene and styrene maleic anhydride copolymers and block copolymers of styrenebutadiene and styrene-butadiene-styrene.

The styrene-maleic anhydride copolymers are described in U.S. Pat. No. 2,971,939; U.S. Pat. No. 3,336,267 and U.S. Pat. No. 2,769,804 which are hereby incorporated by reference.

The rubber-modified, high-impact styrene resins are preferred and these may be made by well known procedures with rubbers such as nitrile rubbers, polybutadiene rubber, styrenebutadiene rubber, polysulfide rubber, ethylene-propylene copolymers, propylene oxide and EPDM.

The composition of the invention may comprise from 10 to 90 parts by weight of a polyphenylene ether resin; from 90 to 10 parts by weight of a vinyl aromatic resin and from 0.5 to 10 parts by weight of an N-alkanoyl-p-aminophenol.

Other additives, processing aids, fillers, reinforcements, flame retardants, pigments and the like may also be present.

Reinforcing fillers such as aluminum, iron or nickel, and the like and non-metals, such as carbon filaments, silicates, such as acicular calcium silicate, asbestos, titanium dioxide, potassium titanate and whiskers, glass flakes and fibers may be used. It is also to be understood that, unless the filler adds to the strength and stiffness of the composition, it is only a filler and not a reinforcing filler.

In particular, the preferred reinforcing fillers are of glass and it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for plastics reinforcement are made by mechanical pulling.

If a reinforcing filler is used it may comprise from 1-80% by weight of the total composition.

Flame retardants may also be included in the composition such as those disclosed in U.S. Pat. No. 3,671,487 which is hereby incorporated by reference.

Triarylphosphates such as triphenylphosphate may be added as a stabilizer for the compositions. Amounts of from 2–10% by weight of total composition may be employed. Metal sulfides and metal oxides such as titanium dioxide, zinc oxide and zinc sulfide may be added at a level of from 0.05–5% by weight of total composition to exert an additional stabilizing effect. Optionally, trialkylphosphites may also be present as stabilizers. The preferred trialkylphosphite is from 0.05–5% by weight of total composition of tridecylphosphite.

|  | Example I | Example II | Control |
|---|---|---|---|
| poly(2,6-dimethyl-1,4-phenylene) ether (PPO, General Electric Co.) | 500 | 500 | 500 |
| rubber modified, high impact polystyrene (Foster Grant 834) | 500 | 500 | 500 |
| triphenylphosphate | 30 | 30 | 30 |
| tridecylphosphite | 10 | 10 | 10 |
| zinc sulfide | 10 | 10 | 10 |
| zinc oxide | 10 | 10 | 10 |
| titanium dioxide | 10 | 10 | 10 |
| N-lauroyl-p-aminophenol | 10 | — | — |
| N-stearoyl-p-aminophenol | — | 10 | — |
| polyethylene | — | — | — |

The molded test pieces were placed in a forced air oven at 125° C. Tensile elongation was measured periodically and the time to failure was recorded when the specimen exhibited a brittle break. The results were as follows:

| Example I | 30 Days |
|---|---|
| Example II | 32 Days |
| Control | 17 Days |

|  | Example III | Example IV | Control |
|---|---|---|---|
| poly(2,6-dimethyl-1,4-phenylene) ether (PPO, General Electric Co.) | 400 | 400 | 400 |
| rubber modified, high impact polystyrene (Foster Grant 834) | 600 | 600 | 600 |
| Polyethylene | 15 | 15 | 15 |
| Triphenylphosphate | 80 | 80 | 80 |
| Zinc oxide | 1.5 | 1.5 | 1.5 |
| Zinc sulfide | 1.5 | 1.5 | 1.5 |
| Tridecylphosphite | 5.0 | 5.0 | 5.0 |
| N-lauroyl-p-aminophenol | 7.5 | — | — |
| N-stearoyl-p-aminophenol | — | 7.5 | — |

Time to embrittlement at 100° C:

|  | Hrs. |
|---|---|
| Example III | 2770 |
| Example IV | 2820 |
| Control | 1268 |

| | Example V | Example VI | Control |
|---|---|---|---|
| Poly(2,6-dimethyl-1,4-phenylene) ether (PPO, General Electric Co.) | 350 | 350 | 350 |
| Rubber modified high impact polystyrene (Cosden 945 E) | 650 | 650 | 650 |
| Polyethylene | 15 | 15 | 15 |
| Triphenylphosphate | 70 | 70 | 70 |
| Zinc oxide | 1.5 | 1.5 | 1.5 |
| Zinc sulfide | 1.5 | 1.5 | 1.5 |
| Tridecylphosphite | 5.0 | 5.0 | 5.0 |
| N-lauroyl-p-aminophenol | 5.0 | — | — |
| N-stearoyl-p-aminophenol | — | 5.0 | — |

Time to embrittlement at 115° C:

| | Hrs. |
|---|---|
| Example V | 1458 |
| Example VI | 1582 |
| Control | 791 |

Obviously, other modifications and variations of the present invention are possible in the light of the above teachings. It is, therefore, to be understood that changes may be made in the particular embodiments of the invention described which are within the full intended scope of the invention as defined by the appended claims.

I claim:

1. A thermoplastic molding composition having improved resistance to thermal aging in the presence of air which comprises:
   a. a polyphenylene ether resin;
   b. a vinyl aromatic resin; and
   c. an amount of an N-alkanoyl-p-aminophenol sufficient to improve the resistance of said composition to thermal aging.

2. The stabilized composition of claim 1 wherein said polyphenylene ether resin is of the formula:

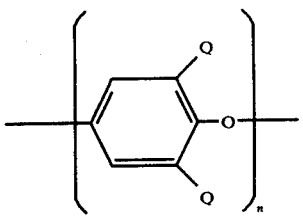

wherein the oxygen ether atom of one unit is connected to the benzene nucleus of the next adjoining unit, $n$ is a positive integer and is at least 50, and each Q is a monovalent substituent selected from the group consisting of hydrogen, halogen, hydrocarbon radicals free of a tertiary alpha carbon atom, halohydrocarbon radicals having at least two carbon atoms between the halogen atom and the phenyl nucleus, hydrocarbonoxy radicals and halohydrocarbonoxy radicals having at least two carbon atoms.

3. The stabilized composition of claim 1 wherein said polyphenylene ether resin is poly(2,6-dimethyl-1,4-phenylene) ether.

4. The stabilized composition of claim 1 wherein at least 25% of the units of said vinyl aromatic resin are derived from monomer of the formula:

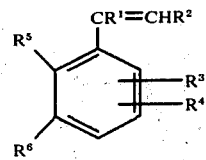

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and alkenyl groups of from 1 to 6 carbons or $R^5$ and $R^6$ may be concatenated together with hydrocarbyl groups to form a naphthyl group.

5. The stabilized composition of claim 4 wherein said vinyl aromatic resin is a rubber-modified, high-impact polystyrene.

6. The stabilized composition of claim 1 which includes from 10 to 90 parts by weight of a polyphenylene ether resin; from 90-10 parts by weight of a vinyl aromatic resin and from 0.5 parts by weight of an N-alkanoyl-p-aminophenol.

7. The stabilized composition of claim 6 wherein the N-alkanoyl-p-aminophenol is N-lauroyl-p-aminophenol.

8. The stabilized composition of claim 6 wherein the N-alkanoyl-p-aminophenol is N-stearoyl-p-aminophenol.

9. The stabilized composition of claim 1 including a flame retardant amount of a flame retardant agent.

10. The stabilized composition of claim 1 including a reinforcing amount of reinforcing filler.

11. The stabilized composition of claim 9 including a reinforcing amount of a reinforcing filler.

12. The stabilized composition of claim 1 including a stabilizing amount of triphenylphosphate.

13. The stabilized composition of claim 12 including a stabilizing amount of zinc sulfide.

14. The stabilized composition of claim 13 including a stabilizing amount of tridecylphosphite.

15. The stabilized composition of claim 14 including a stabilizing amount of zinc oxide.

16. A method of improving the resistance to thermal aging of a polyphenylene ether resin and a vinyl aromatic resin composition, said method comprising adding to said composition an amount of an N-alkanoyl-p-aminophenol that is sufficient to increase the resistance of said composition to thermal degradation in the presence of air.

17. A thermoplastic molding composition having improved resistance to thermal aging, in the presence of air said composition comprising:
   a. from 10 to 90 by weight of a polyphenylene ether resin of the formula:

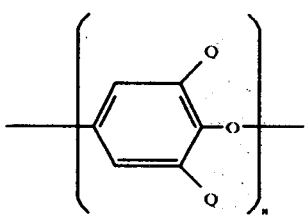

wherein the oxygen ether atom of one unit is connected to the benzene nucleus of the next adjoining unit, $n$ is a positive integer and is at least 50, and each Q is a monovalent substituent selected from the group consisting of hydrogen, halogen, hydrocarbon radicals free of a tertiary alpha carbon atom, halohydrocarbon radicals having at least two carbon atoms between the halogen atom and the phenyl nucleus, hydrocarbonoxy radicals and halohydrocarbonoxy radicals having at least two carbon atoms;

b. from 90 to 10 parts by weight of a vinyl aromatic resin wherein at least 25% of the units of said vinyl aromatic resin are derived from a monomer of the formula:

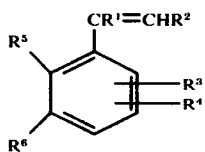

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and alkenyl groups of from 1 to 6 carbon atoms or $R^5$ and $R^6$ may be concatenated together with hydrocarbyl groups to form a naphthyl group; and c. from 0.5 to 10 parts by weight of an N-alkanoyl-p-aminophenol.

18. A thermoplastic molding composition as defined in claim 17 which also includes from 0.05-5% by weight of a metal sulfide and a metal oxide.

* * * * *